United States Patent
Izumi et al.

(10) Patent No.: US 11,972,270 B2
(45) Date of Patent: Apr. 30, 2024

(54) COMMUNICATION DEVICE, NON-TRANSITORY COMPUTER-READABLE RECORDING MEDIUM STORING COMPUTER-READABLE INSTRUCTIONS FOR COMMUNICATION DEVICE, AND METHOD PERFORMED BY COMMUNICATION DEVICE

(71) Applicant: BROTHER KOGYO KABUSHIKI KAISHA, Nagoya (JP)

(72) Inventors: Koki Izumi, Nagoya (JP); Satoshi Matsushita, Nagoya (JP); Satoru Yanagi, Obu (JP); Munehisa Matsuda, Nagoya (JP); Kiyotaka Ohara, Nagoya (JP); Katsunori Enomoto, Toyokawa (JP); Yuki Yada, Kuwana (JP); Kyohei Mori, Nagoya (JP); Hideki Nogawa, Nagoya (JP); Tetsuya Okuno, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/360,320

(22) Filed: Jul. 27, 2023

(65) Prior Publication Data
US 2024/0036885 A1 Feb. 1, 2024

(51) Int. Cl.
*H04L 69/16* (2022.01)
*G06F 9/445* (2018.01)

(52) U.S. Cl.
CPC .......... *G06F 9/44505* (2013.01); *H04L 69/16* (2013.01)

(58) Field of Classification Search
CPC . G06F 9/44505; H04L 69/16; H04L 41/0213; H04L 41/0246; H04L 41/0253; H04L 41/104
See application file for complete search history.

(56) References Cited

U.S. PATENT DOCUMENTS 6,008,805 A * 12/1999 Land ..................... H04L 41/046
715/744
6,389,464 B1 * 5/2002 Krishnamurthy ... H04L 41/0253
709/221

(Continued)

FOREIGN PATENT DOCUMENTS

CN 1744519 A * 3/2006
JP 3782600 B2 * 6/2006 ......... H04L 41/0213

(Continued)

*Primary Examiner* — Oanh Duong
(74) *Attorney, Agent, or Firm* — Scully, Scott, Murphy & Presser, PC

(57) ABSTRACT

A communication device may include: a memory configured to store management information in which, for each of a plurality of OIDs of a MIB, the OID and a setting value are associated with each other; and a controller, wherein the controller may be configured to: receive a setting command which conforms to TCP; write the setting value included in the setting command to the management information in association with the OID included in the setting command; and send a response command which conforms to the TCP. In a case where the setting command including a first OID and a first setting value is received, the controller may be configured to: write the first setting value to the management information in association with the first OID after the response command has been sent, and send the response command before the first setting value is written to the management information.

14 Claims, 4 Drawing Sheets

(56) References Cited

U.S. PATENT DOCUMENTS

Figure 1:
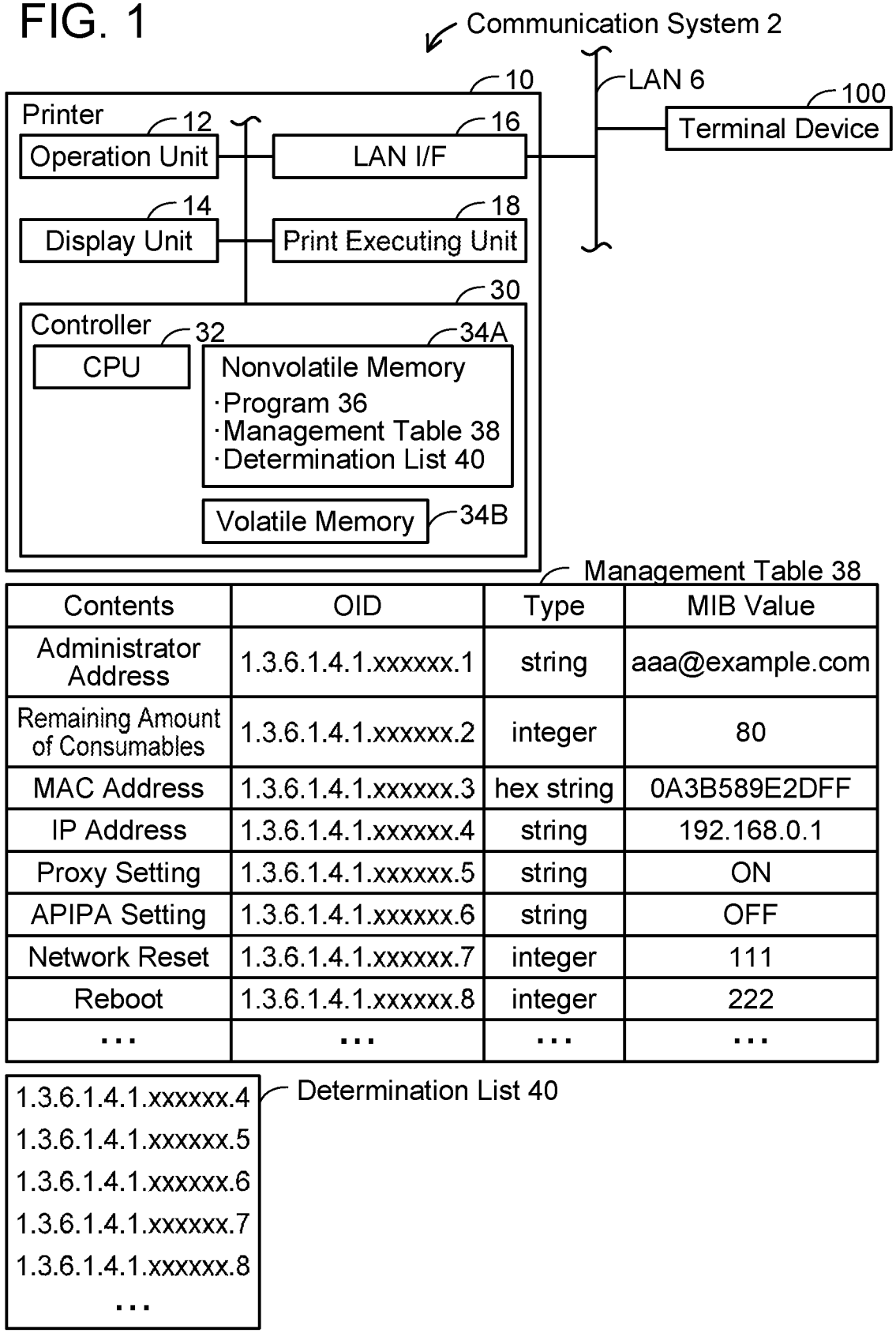

| | | | |
|---|---|---|---|
| 7,254,781 B1 * | 8/2007 | Land | H04L 12/2856 726/2 |
| 7,739,362 B1 * | 6/2010 | Zhang | H04L 41/0213 709/224 |
| 10,601,635 B1 * | 3/2020 | Zuberi | H04L 43/10 |
| 2004/0208177 A1 * | 10/2004 | Ogawa | H04L 49/90 370/392 |
| 2007/0150619 A1 * | 6/2007 | Land | H04L 41/082 709/246 |
| 2007/0288558 A1 * | 12/2007 | Land | H04L 41/0226 709/203 |
| 2009/0222546 A1 | 9/2009 | Hatano | |
| 2010/0180110 A1 * | 7/2010 | Mittapalli | G06F 9/4411 713/100 |
| 2011/0295989 A1 * | 12/2011 | Kiyoto | H04L 41/0226 709/223 |
| 2017/0006468 A1 * | 1/2017 | Takahashi | G06F 3/1236 |

FOREIGN PATENT DOCUMENTS

| | | | | |
|---|---|---|---|---|
| JP | 2009-211175 A | | 9/2009 | |
| WO | WO-2010048793 A1 * | | 5/2010 | H04L 41/0233 |
| WO | WO-2020102805 A1 * | | 5/2020 | G06F 11/2071 |

* cited by examiner

FIG. 4

POST Command 200

Header Part

Body Part
```
{
  "request": [
    {
      "key":"1.3.6.1.4.1.xxxxxx.8",          / 202
      "int_value":222
    },
    {
      "key":"1.3.6.1.4.1.xxxxxx.4",          / 204
      "string_value":"192.168.2.2"
    },
    {
      "key":"1.3.6.1.4.1.xxxxxx.1",          / 206
      "string_value":"bbb@example.com"
    }
  ]
}
```

Response Command 210

Header Part

Body Part
```
{
  "response": [
    {
      "key":"1.3.6.1.4.1.xxxxxx.8",          / 212
      "status":"success"
    },
    {
      "key":"1.3.6.1.4.1.xxxxxx.4",          / 214
      "status":"success"
    },
    {
      "key":"1.3.6.1.4.1.xxxxxx.1",          / 216
      "status":"success"
    }
  ]
}
```

COMMUNICATION DEVICE, NON-TRANSITORY COMPUTER-READABLE RECORDING MEDIUM STORING COMPUTER-READABLE INSTRUCTIONS FOR COMMUNICATION DEVICE, AND METHOD PERFORMED BY COMMUNICATION DEVICE

REFERENCE TO RELATED APPLICATIONS

This application claims priority from Japanese Patent Application No. 2022-121705 filed on Jul. 29, 2022. The entire content of the priority application is incorporated herein by reference.

BACKGROUND ART

A management device that manages device(s) according to Simple Network Management Protocol (SNMP) is known.

DESCRIPTION

The SET command which conforms to SNMP is a command which conforms to User Datagram Protocol (UDP) of a transport layer of an Open Systems Interconnection (OSI) reference model. In UDP, a device which is a sender of a command does not need to receive a response command from a device to which the command is sent.

The present disclosure discloses a technique that enables suitable communication between a terminal device and a communication device in the situation where a setting command is sent from the terminal device to the communication device without using UDP.

A communication device disclosed herein may comprise: a memory configured to store management information in which, for each of a plurality of Object IDs (OID) of a Management Information Base (MIB), the OID and a setting value are associated with each other; and a controller, wherein the controller may be configured to: receive, from a terminal device, a setting command which conforms to Transmission Control Protocol (TCP) of a transport layer of an Open System Interconnection (OSI) reference model, wherein the setting command includes an OID and a setting value; in a case where the setting command is received from the terminal device, write the setting value included in the setting command to the management information in association with the OID included in the setting command; and in the case where the setting command is received from the terminal device, send a response command which conforms to the TCP to the terminal device, wherein in a case where the setting command including a first OID and a first setting value is received from the terminal device, the controller may be configured to: write the first setting value to the management information in association with the first OID after the response command has been sent to the terminal device; and send the response command to the terminal device before the first setting value is written to the management information.

In the TCP, a device which sends a command (i.e., the above terminal device) needs to receive a response command from a device to which the command is sent (i.e., the above communication device). According to the above configuration, when the communication device receives the setting command which conforms to the TCP from the terminal device, the communication device writes the first setting value to the management information in association with the first-OID after sending the response command to the terminal device. Therefore, it is possible to suppress the occurrence of the event in which the communication device cannot send the response command to the terminal device due to the communication device writing the first setting value to the management information before the response command is sent. As described above, in the situation where the setting command which conforms to the TCP is sent from the terminal device to the communication device, communication between the terminal device and the communication device can suitably be executed.

Computer program for realizing the above communication device, and a non-transitory computer-readable recording medium storing the computer-readable instructions for the communication device are also novel and useful. Furthermore, a method performed by the above communication device is also novel and useful.

Figure 2:
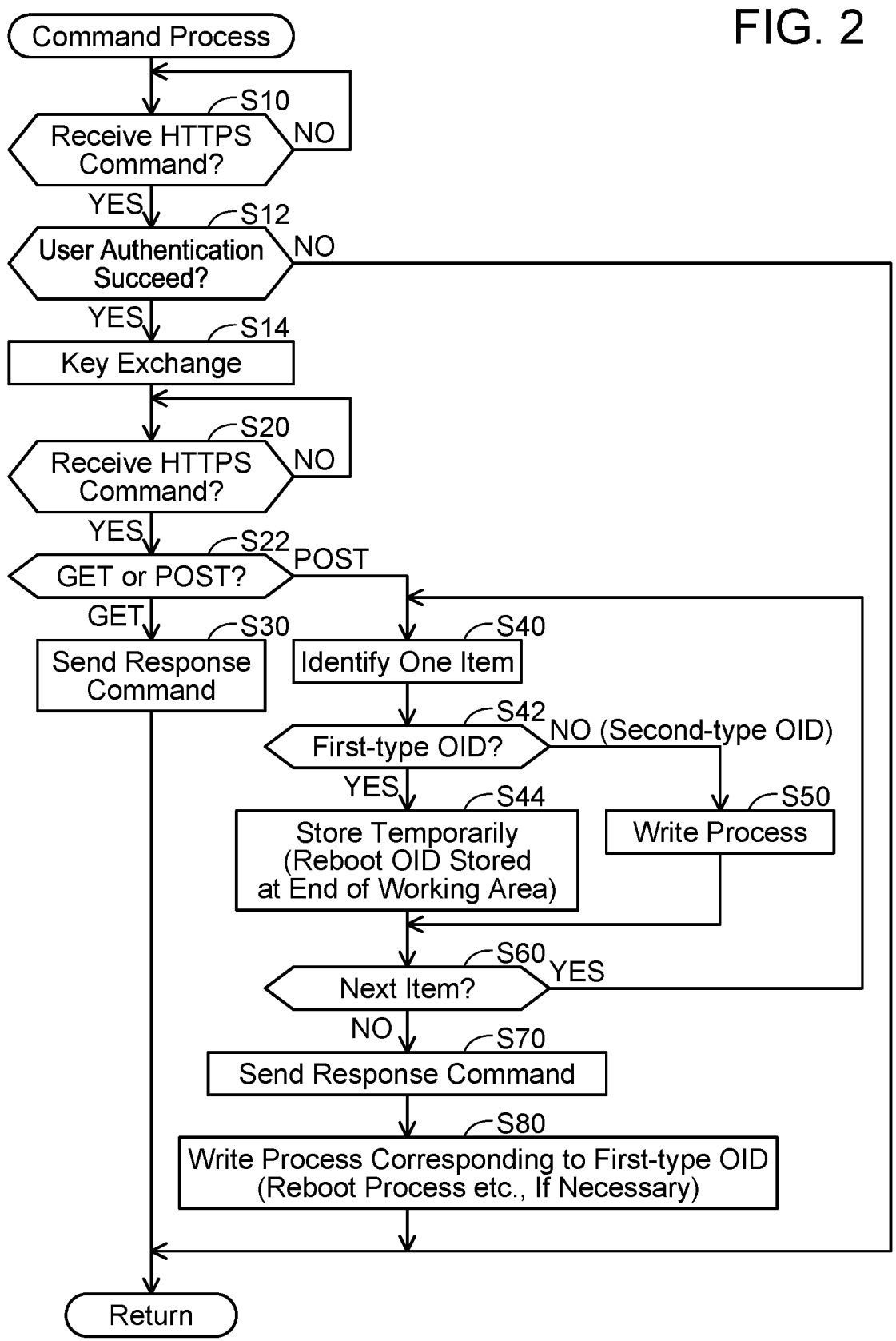
Figure 3:
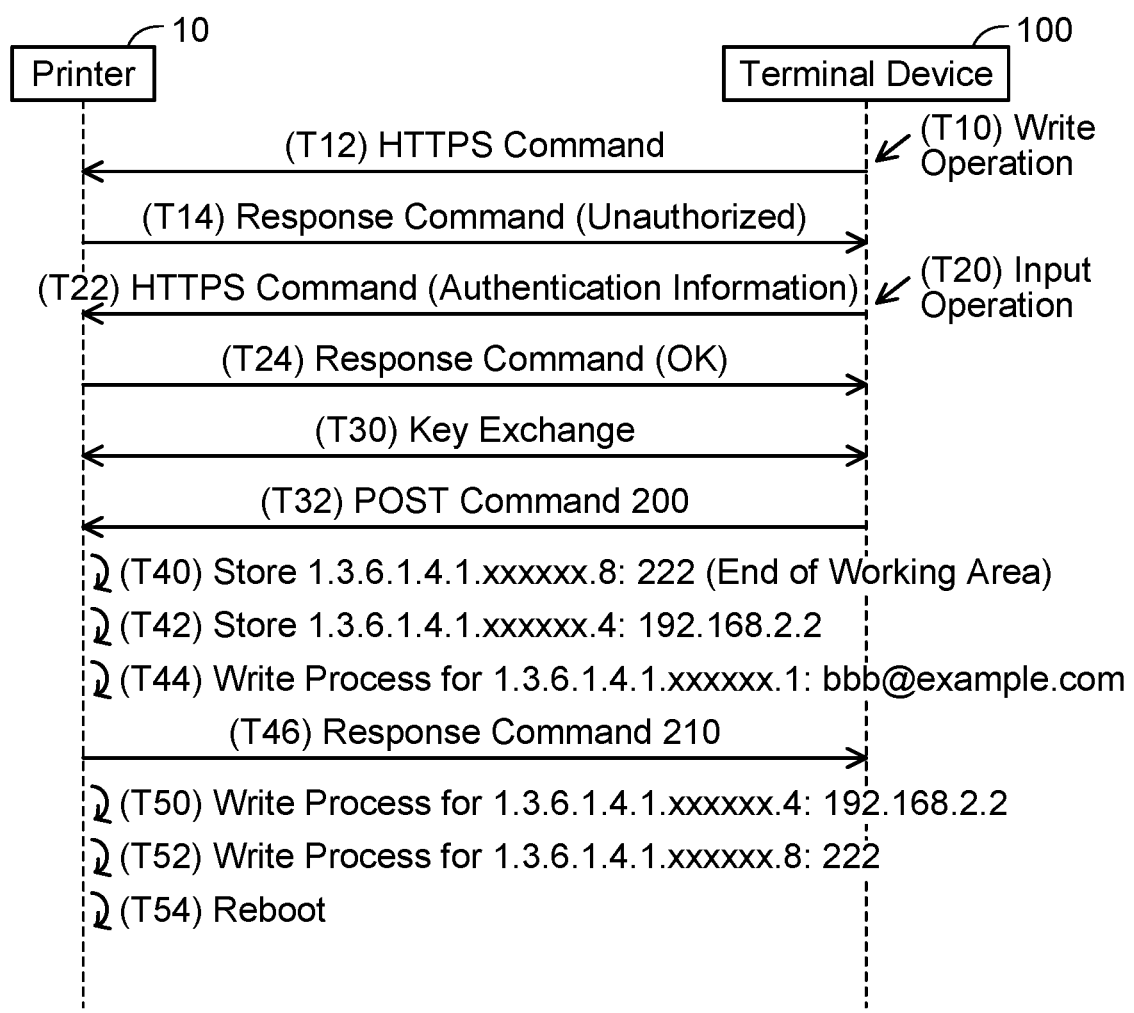

FIG. 1 illustrates a configuration of a communication system.
FIG. 2 illustrates a flowchart of a command process.
FIG. 3 illustrates a specific case.
FIG. 4 illustrates examples of a POST command and a response command.

CONFIGURATION OF COMMUNICATION SYSTEM 2; FIG. 1

As illustrated in FIG. 1, a communication system 2 includes a printer 10 and a terminal device 100. Each of the devices 10, 100 is connected to a Local Area Network (LAN) 6 and is configured to communicate with each other via the LAN 6. The LAN 6 may be a wired LAN or a wireless LAN. The terminal device 100 is a user terminal such as a desktop PC, laptop PC, tablet PC, a cell phone (e.g., a smartphone), or the like. In the present embodiment, the printer 10 implements writing or sending of a setting value in response to a request command (i.e., POST or GET command to be described later) from the terminal device 100.

(Configuration of Printer 10)

The printer 10 is a peripheral device configured to execute a printing function (e.g., a peripheral device of the terminal device 100). In a modification, the printer 10 may be a multifunctional device configured to execute a scanning function, a facsimile function and the like, in addition to the printing function. The printer 10 includes an operation unit 12, a display unit 14, a LAN interface 16, a print executing unit 18, and a controller 30. Each of the units 12 to 30 is connected to a bus line (reference sign omitted).

The operation unit 12 includes a plurality of keys. The user can input various instructions to the printer 10 by operating the operation unit 12. The display unit 14 is a display that displays various information. The display unit 14 functions also as a so-called touch screen (i.e., an operation unit which accepts an operation by a user). The LAN interface 16 is connected to the LAN 6. The print executing unit 18 comprises a printing mechanism of an inkjet scheme, a laser scheme, or the like.

The controller 30 includes a CPU 32, a nonvolatile memory 34A, and a volatile memory 34B. The CPU 32 executes various processes according to a program 36 stored in the nonvolatile memory 34A. The nonvolatile memory 34A is a memory in which information stored therein is not deleted even when the printer 10 is turned off. In addition to the program 36, the nonvolatile memory 34A stores a management table 38 and a determination list 40. The volatile memory 34B is a memory in which information stored therein is deleted when the printer 10 is turned off. The volatile memory 34B temporarily stores information necessary for the CPU 32 to execute processes.

The management table 38 is a table for storing various information about the printer 10. The information includes, for example, an administrator address of the printer 10, a remaining amount of consumables, a MAC address, and the like.

The information stored in the management table 38 further includes communication settings for the printer 10 to execute communication. The communication settings include an IP address of the printer 10, a Proxy setting, an Automatic Private IP Addressing (APIPA) setting, Network Reset, and the like. The Proxy setting is a setting for the printer 10 to use a proxy server. The APIPA is a setting for assigning an IP address to the printer 10. The Network Reset is a setting for resetting (i.e., initializing) the communication settings of the printer 10 when a predetermined setting value ("111" in this embodiment) is written to the management table 38.

The information stored in the management table 38 further includes Reboot (i.e., restart). The Reboot is a setting to reboot the printer 10 when a predetermined setting value ("222" in this example) is written to the management table 38.

Information not illustrated in FIG. 1 includes, for example, a location where the printer 10 is set up, where the printer 10 accesses, an error history, a status (e.g., printing in progress, waiting, etc.), and print settings (e.g., default print resolution). The management table 38 uses a tree structure (i.e., a hierarchical structure) to store the various information described above. This set of various information having the tree structure is called "Management Information Base (MIB)".

Specifically, the management table 38 stores contents, an Object ID (OID), a type, and an MIB value in association with each other. The contents are a character string that indicates a meaning of the information. The OID is an identifier that identifies the information. The type indicates a type of the MIB value. The MIB value indicates a specific value of the information (i.e., the setting value).

The determination list 40 is a list for determining whether the OID in the management table 38 is a first-type OID or a second-type OID. The first-type OID is an OID associated with a setting value to be written to the management table 38 after the response command has been sent. The second-type OID is an OID associated with a setting value to be written to the management table 38 before the response command is sent. The information in the determination list 40 is predetermined by a vendor of the printer 10. The determination list 40 includes a plurality of OIDs. Each of these OIDs is the first-type OID. That is, the determination list 40 does not include the second-type OID. Therefore, increase in a capacity of the determination list 40 can be suppressed.

The first-type OID includes OIDs of the communication settings (i.e., OIDs ending with "4" to "7") and a Reboot OID (i.e., an OID ending with "8"). When the MIB value of the communication settings is written before the response command is sent (i.e., when the MIB value of the communication settings is changed), the printer 10 may not be able to send the response command due to the printer 10 not being able to properly execute communication. Therefore, in the present embodiment, after the response command has been sent, the MIB value of the communication settings is written to the management table 38. When the Reboot MIB value "222" is written before the response command is sent, the printer 10 may not be able to send the response command due to the printer 10 rebooting. For example, when the printer 10 receives a command instructing writing of the Reboot MIB value "222" (a POST command to be described later), the printer 10 usually executes a process thread corresponding to this command in a working area in the volatile memory 34B. Here, when there is a process thread indicating that the response command is to be sent after the MIB value is written, the process thread is deleted because the printer 10 reboots when the Reboot MIB value "222" is written. As a result, the printer 10 cannot send the response command after the rebooting. Therefore, in the present embodiment, the Reboot MIB value "222" is written to the management table 38 after the response command has been sent.

(Communication Protocol between Printer 10 and Terminal Device 100)

As a communication protocol for communicating the MIB value between the printer 10 and the terminal device 100, a protocol which conforms to the User Datagram Protocol (UDP) of a transport layer of the Open Systems Interconnection (OSI) reference model is widely known. Specifically, Simple Network Management Protocol (SNMP) is known. The inventors of the present application have created use of a communication protocol which conforms to the Transmission Control Protocol (TCP) of the transport layer of the OSI reference model, instead of the UDP, as a communication protocol to communicate the MIB value. Specifically, the inventors have created the use of Hyper Text Transfer Protocol Secure (HTTPS). This is because HTTPS has higher security than SNMP since HTTPS employs user authentication and data encryption. This suppresses unauthorized writing or unauthorized acquisition of the MIB value of the printer 10 by a third party.

UDP has no arrangement to execute communication of the response command. Therefore, the terminal device 100 does not monitor receipt of the response command after sending the SET command of SNMP to the printer 10. TCP, on the other hand, has an agreement to execute communication of the response command. Therefore, the terminal device 100 monitors receipt of the response command after sending the POST command of TCP to the printer 10. Therefore, when the terminal device 100 does not receive the response command from the printer 10, a processing load may be increased by continuing monitoring or an error screen may be displayed. To suppress the occurrence of such events, in the present embodiment, when the printer 10 receives the POST command that instructs writing of the MIB value that affects sending of the response command, the printer 10 writes the MIB value after the response command has been sent. To achieve this, the printer 10 executes the process illustrated in FIG. 2.

(Command Process by Printer 10: FIG. 2)

With reference to FIG. 2, the command process executed by the CPU 32 of the printer 10 will be described. Execution of the process illustrated in FIG. 2 is triggered when the printer 10 is turned on.

In S10, the CPU 32 monitors receipt of an HTTPS command from the terminal device 100. When the CPU 32 receives the HTTPS command from the terminal device 100, the CPU 32 determines YES in S10 and proceeds to S12.

In S12, the CPU 32 determines whether the user authentication has succeeded. Specifically, the CPU 32 sends, to the terminal device 100, a response command indicating that the user authentication has not yet succeeded (i.e., Unauthorized) for the HTTPS command received in S10. The CPU 32 receives an HTTPS command including authentication information (e.g., user password) from the terminal device 100, and determines whether the authentication information included in the HTTPS command and the authentication information already stored in the printer 10 match. When these pieces of authentication information match, the CPU 32 sends a response command indicating that the authentication has succeeded to the terminal device 100, and determines YES in S12 and proceeds to S14. As described above, since the writing and sending of the MIB value are executed on the condition that the user authentication succeeds, the security of the printer 10 can be enhanced. On the other hand, when these pieces of authentication information do not match, the CPU 32 determines NO in S12 and returns to S10.

In S14, the CPU 32 exchanges an encryption key with the terminal device 100. As a result, in the subsequent communication between the printer 10 and the terminal device 100 (e.g., S20, S30, S70), the information in the HTTPS command and the response command is encrypted. In this way, since the information in the commands is encrypted, security of the printer 10 can be enhanced.

In S20, the CPU 32 monitors receipt of the HTTPS command from the terminal device 100. The information in this HTTPS command is encrypted (see S14). When the CPU 32 receives the HTTPS command from the terminal device 100, the CPU 32 determines YES in S20 and proceeds to S22.

In S22, the CPU 32 determines whether the HTTPS command received in S20 is a GET command or a POST command. When the HTTPS command is a GET command, the CPU 32 proceeds to S30, while when the HTTPS command is a POST command, the CPU 32 proceeds to S40. The GET command may be a command which conforms to the GET method of HTTP, or it may be a command which conforms to the POST method of HTTP in which "X-HTTP-Method-Override 'GET'" is described in the header. The POST command is a command which conforms to the POST method of HTTP.

The HTTPS command and its response command usually employ a general-purpose format such as Java Script Object Notation (JSON) or Extensible Markup Language (XML). In the present embodiment, the CPU 32 receives the HTTPS command described in the JSON format (YES in S20) and sends the response command described in the JSON format to the terminal device 100 in the processes of S30 and S70 to be described later. In a modification, the CPU 32 may receive the HTTPS command described in the XML format and send the response command described in the XML format to the terminal device 100.

In S30, the CPU 32 generates a response command corresponding to the GET command received in S20. Specifically, the CPU 32 obtains one or more MIB values associated with one or more OIDs included in the GET command from the management table 38. The CPU 32 writes the obtained one or more MIB values in the body part of the response command. The CPU 32 then sends the response command to the terminal device 100.

When the terminal device 100 receives the above response command from the printer 10, the terminal device 100 displays the information in this response command. This allows the user to see the setting values in the printer 10. When the process of S30 ends, the CPU 32 returns to S10.

In S40, the CPU 32 identifies one item from one or more items described in the body part in the POST command received in S20. The one item identified here includes an OID, a type, and an MIB value. This type is information indicating the type of the MIB value, such as string, integer, or the like. Hereinbelow, the OID and the MIB value included in the one item identified in S40 are described as "target OID" and "target MIB value", respectively.

In S42, the CPU 32 determines whether the target OID is the first-type OID or the second-type OID. Specifically, the CPU 32 determines whether the target OID is included in the determination list 40. When the target OID is included in the determination list 40, the CPU 32 determines that the target OID is the first-type OID (YES in S42) and proceeds to S44. On the other hand, when the target OID is not included in the determination list 40, the CPU 32 determines that the target OID is the second-type OID (NO in S42) and proceeds to S50. As described above, the printer 10 can change the timing for executing the MIB value write process depending on whether the target OID is included in the determination list 40.

In S44, the CPU 32 stores the target OID and the target MIB value in a predetermined working area in the volatile memory 34B in association with each other without writing the target MIB value to the management table 38 in association with the target OID. This allows the CPU 32 to write the target MIB value to the management table 38 in association with the target OID stored in the above predetermined working area after sending the response command.

Here, when the target OID is the Reboot OID (i.e., the OID ending with "8"), the CPU 32 writes the target OID and the target MIB value (i.e., "222") at the end of the above predetermined working area. When the Reboot OID and the MIB value "222" have already been stored at the end of the above predetermined working area at the time of executing S44, the CPU 32 writes the target OID and target MIB value at a location forward of the location where the Reboot OID and MIB value are written. That is, the CPU 32 executes the process of S44 so that the Reboot OID is stored at the end of the working area in the situation where a plurality of first-type OIDs is to be stored in the above predetermined working area. This allows the CPU 32 to write the MIB value "222" to the management table 38 in association with the Reboot OID last when executing the write process corresponding to each of the OIDs stored in the above predetermined working area.

If the configuration which allows other OID(s) and MIB value(s) to be written behind the location where the Reboot OID and the MIB value are written is employed in the process of S44, the following event may occur. That is, when the printer 10 executes the write process (see S80 to be described later) corresponding to each OID stored in the above predetermined working area, the printer 10 may write the MIB value "222" to the management table 38 in association with the Reboot OID before writing the MIB value(s) to the management table 38 in association with the other OID(s). In this case, the printer 10 is rebooted and the contents stored in the above predetermined working area are deleted. As a result, the printer 10 cannot write the MIB value(s) to the management table 38 in association with the above other OID(s). In contrast, in the present embodiment, since the printer 10 stores the Reboot OID at the end of the above predetermined working area, the printer 10 can write the MIB value "222" to the management table 38 last in association with the Reboot OID. This can suppress the occurrence of the event in which the MIB value(s) cannot be written to the management table 38 in association with the other OID(s).

In S50, the CPU 32 writes the target MIB value to the management table 38 in association with the target OID which is a second-type OID. As described above, for the second-type OID that do not affect sending of the response command, the CPU 32 can suitably write the MIB value before sending the response command.

In S60, the CPU 32 determines whether there is a next item in the POST command. When there is a next item, the CPU 32 determines YES in S60, identifies the next item in S40, and again executes S42 and the subsequent processes. When there is no next item, the CPU 32 determines NO in S60 and proceeds to S70.

In S70, the CPU 32 sends the response command to the terminal device 100. This makes it unnecessary for the terminal device 100 to monitor receipt of the response command in the subsequent processes. This response command includes the OID in each item identified in S40 and the status information indicating that the writing of the MIB value has been completed. The information in this response command is encrypted (see S14 in FIG. 2). At S60, writing of the MIB value associated with the second-type OID has been completed (see S50), however, writing of the MIB value associated with the first-type OID is not completed yet. Despite of this fact, the response command includes the status information indicating that the writing of the MIB value has been completed for both OIDs. This allows the terminal device 100 to know that the processes have properly been executed for any of the OIDs in the POST command.

In S80, the CPU 32 executes the write process corresponding to each OID (i.e., first-type OID) stored in the above predetermined working area in S44. Specifically, the CPU 32 first identifies the OID at the front among the OIDs stored in the above predetermined working area and the MIB value associated with this OID. The CPU 32 writes the identified MIB value to the management table 38 in association with the identified OID. Similarly, the CPU 32 sequentially processes the OIDs stored in the above predetermined working area. As described above, since the Reboot OID is stored at the end of the above predetermined working area, the CPU 32 writes the MIB value "222" to the management table 38 last in association with the Reboot OID. Consequently, the CPU 32 reboots the printer 10. As described above, in the present embodiment, before the printer 10 is rebooted, the MIB values are written to the management table 38 in association with the other OIDs in the above predetermined working area. This can suppress the occurrence of the event in which the MIBs value cannot be written to the management table 38 in association with the other OIDs. When S80 ends, the CPU 32 returns to S10.

(Specific Case)

Next, with reference to FIGS. 3 and 4, a specific case realized by the processes in FIG. 2 will be described. In particular, the case in which the POST command is sent from the terminal device 100 to the printer 10 will be described.

The terminal device 100 accepts a write operation from the user in T10. The write operation includes an operation to designate three pieces of information to be written: "Reboot"; "IP address"; and "Administrator Address". The write operation further includes an operation to designate a character string to which each of "IP address" and "Administrator Address" is to be changed. In this case, the terminal device 100 sends an HTTPS command to the printer 10 in T12.

When the printer 10 receives the HTTPS command from the terminal device 100 in T12 (YES in S10 of FIG. 2), the printer 10 sends a response command indicating "Unauthorized" to the terminal device 100 in T14 (S12).

When the terminal device 100 receives the response command from the printer 10 in T14, the terminal device 100 displays a screen for inputting authentication information (not illustrated) and accepts an operation to input the authentication information from the user in T20. In this case, the terminal device 100 sends an HTTPS command including the authentication information to the printer 10 in T22.

When the printer 10 receives the HTTPS command from the terminal device 100 in T22, the printer 10 sends a response command indicating success of the authentication to the terminal device 100 in T24 (YES in S12). Then, in T30, the printer 10 exchanges an encryption key with the terminal device 100 (S14).

When the terminal device 100 exchanges the encryption key with printer 10 in T30, the terminal device 100 sends a POST command 200 corresponding to the write operation of T10 to the printer 10 in T32. Specifically, similar to the management table 38 of the printer 10, the terminal device 100 stores contents of information, the OID, and the type in association with each other. Therefore, the terminal device 100 can identify the OID ending with "8" and the type "integer" from the information "Reboot" designated in the write operation of T10, and write those pieces of information to the POST command 200. The terminal device 100 can identify the OID ending with "4" and the type "string" from the information "IP Address" designated in the write operation of T10, and write those pieces of information to the POST command 200. The terminal device 100 can identify the OID ending with "1" and the type "string" from the information "Administrator Address" designated in the write operation of T10 and write those pieces of information to the POST command 200.

As illustrated in FIG. 4, the POST command 200 is written in the JSON format and includes a header part and a body part. The body part includes three items 202, 204, and 206. The item 202 includes: an OID ending with "8" corresponding to the information "Reboot"; "int_value" corresponding to the type "integer"; and a predetermined MIB value "222". The item 204 includes: an OID ending with "4" corresponding to the information "IP address"; "string_value" corresponding to the type "string"; and the MIB value "192.168.2.2" specified by the user. The item 206 includes: the OID ending with "1" corresponding to the information "Administrator Address"; "string_value" corresponding to the type "string"; and the MIB value "bbb@example.com" specified by the user.

When the printer 10 receives the POST command 200 from the terminal device 100 in T32 (YES in S20, POST in S22), the printer 10 sequentially processes each of the three items 202, 204, 206.

The printer 10 determines for the item 202 that the OID ending with "8" is the first-type OID (YES in S42). In this case, the printer 10 stores the OID ending with "8" and the MIB value "222" in T40 at the end of the predetermined working area in association with each other (S44).

The printer 10 determines for the item 204 that the OID ending with "4" is the first-type OID (YES in S42). In this case, the printer 10 stores the OID ending with "4" and the MIB value "192.168.2.2" in the above predetermined working area in association with each other in T42 (S44). Here, the printer 10 stores the OID ending with "4" and the MIB value "192.168.2.2" such that the OID ending with "8" and the MIB value "222" stay at the end of the working area.

The printer 10 determines for the item 206 that the OID ending with "1" is the second-type OID (NO in S42). In this case, the printer 10 writes the MIB value "bbb@example.com" to the management table 38 in association with the OID ending with "1" in T44 (S50). As described above, the printer 10 can first write, to the management table 38, the MIB value "bbb@example.com" which does not affect sending of the response command according to the item 206 which is described at the bottom among the items 202, 204, 206.

When the printer 10 executes the processes for the three items 202, 204, and 206 (NO in S60), the printer 10 sends a response command 210 to the terminal device 100 in T46 (S70). As illustrated in FIG. 4, the response command 210 is written in the JSON format and includes the header part and the body part. The body part includes three items 212, 214, and 216. The item 212 includes the same OID as the OID ending with "8" in the item 202 of the POST command 200, and the status information "success". The item 214 includes the same OID as the OID ending with "4" in the item 204 of the POST command 200, and the status information "success". The item 216 includes the same OID as the OID ending with "1" in the item 206 of the POST command 200, and the status information "success".

When the terminal device 100 receives the response command 210 from the printer 10 in T46, the terminal device 100 displays a message indicating that the write process has suitably been completed (not illustrated). This allows the user to know that the write process has suitably been completed.

In T50, the printer 10 identifies the OID (i.e., the OID ending with "4") and the MIB value "192.168.2.2" stored at the front of the above predetermined working area. In this case, the printer 10 writes the MIB value "192.168.2.2" to the management table 38 in association with the OID ending with "4" (S80). As described above, the printer 10 can first write the MIB value "192.168.2.2" to the management table 38 according to the item 204, which is described below the item 202.

In T52, the printer 10 identifies the OID (i.e., the OID ending with "8") and the MIB value "222" stored at the end of the above predetermined working area. In this case, the printer 10 writes the MIB value "222" to the management table 38 in association with the OID ending with "8" (S80). In this way, the printer 10 can write the MIB value "222" to the management table 38 last according to the item 202 described above the items 204 and 206. This causes the printer 10 to reboot in T54. Since the other MIB values have already been written to the management table 38 before the printer 10 reboots (T44, T50), the occurrence of the event that other MIB values cannot be written can be suppressed. When S80 ends, the CPU 32 returns to S10.

Effect of Present Embodiment

When the printer 10 receives the POST command 200 which conforms to TCP from the terminal device 100 (T32), the printer 10 writes the MIB values to the management table 38 in association with the first-type OIDs (T50, T52) after sending the response command 210 to the terminal device (T46). Thus, it is possible to suppress the occurrence of the event in which the printer 10 cannot send the response command 210 to the terminal device 100 due to the MIB values being written to the management table 38 in association with the first-type OIDs before sending the response commend. As described above, according to the present embodiment, in the situation where the POST command which conforms to TCP is sent from the terminal device 100 to the printer 10, communication between the terminal device 100 and the printer 10 can suitably be executed.

After the printer 10 writes the MIB values to the management table 38 in association with each OID other than the Reboot OID included in the POST command 200 (T44, T50), the printer 10 writes the MIB value "222" to the management table 38 in association with the Reboot OID (T52). This can suppress the occurrence of the event in which other MIB value(s) cannot be written to the management table 38 due to the printer 10 rebooting.

(Corresponding Relationships)

The management table 38 is an example of "management information". The POST command 200 and the response command 210 are an example of "setting command" and "response command", respectively. HTTPS is an example of "specific protocol". The determination list 40 is an example of "determination information". The OID ending with "4" and the OID ending with "8" are examples of "first OID". The MIB value "192.168.2.2" and the MIB value "222" are examples of "first setting value". The OID ending with "1" is an example of "second OID". The MIB value "bbb@example.com" is an example of "second setting value". The status information "success" is an example of "specific value".

S20 in FIG. 2 and T32 in FIG. 3 are examples of "receive a setting command". S50, S80, T44, T50, and T52 are examples of "write the setting value". S70 and T46 are examples of "send a response command". S42 is an example of "determine whether the OID included in the setting command is one of the first-type OIDs or one of the second-type OIDs". S44 is an example of "store the first OID and the first setting value in a predetermined storage area in the memory".

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

(Modification 1) The determination list 40 and S42 and S50 in FIG. 2 may be omitted. That is, "determination information" and "determine whether the OID included in the setting command is one of the first-type OIDs or one of the second-type OIDs" may be omitted. That is, regardless of whether the OID included in the setting command is one of the first-type OIDs or one of the second-type OIDs, "write the setting value" may be writing the MIB value to the management information in association with this OID after the response command has been sent to the terminal device.

(Modification 2) The determination list 40 may store type information indicating that an OID is the first type in association with a plurality of first-type OIDs, and may also store type information indicating that an OID is the second type in association with a plurality of second-type OIDs. In another modification, the determination list 40 may store the second-type OIDs alone. According to this configuration, the CPU 32 determines NO in S42 and proceeds to S50 when the target OID is included in the determination list 40 in S40 in FIG. 2, while determines YES in S42 and proceeds to S44 when the target OID is not included in the determination list 40.

(Modification 3) Each of the items 214 and 216 in the response command 210 may include, as the status information, a character string indicating waiting for execution of the write process (e.g., "wait") instead of "success". Generally speaking, "response command" may not include "specific value".

(Modification 4) The determination list 40 may not include the OID(s) for the communication settings. In another modification, the determination list 40 may not include the Reboot OID.

(Modification 5) The "specific protocol" may be HTTP instead of HTTPS. HTTP is more secure than SNMP because it is a protocol that can execute user authentication.

(Modification 6) In the above embodiment, since it is a big problem that the setting value in the printer 10 is changed by an unauthorized third party, the printer 10 changes the setting value according to the POST command of HTTPS having high security. In addition, the printer 10 sends the setting value according to the GET command of HTTPS. Here, the present modification employs a security policy that it has no problem for the setting value in the printer 10 to be obtained by a third party. In this case, instead of receiving the GET command of HTTPS from the terminal device 100, the printer 10 may receive the GET command of SNMP and send the response command of SNMP to the terminal device 100.

(Modification 7) The "communication device" is not limited to a printer, but can be a different kind of device such as a scanner, a facsimile, a PC, or a server.

(Modification 8) In the above embodiment, the processes of FIGS. 2 to 3 are implemented by the CPU 32 executing the program 36, however, at least one of these processes may be implemented by hardware such as a logic circuit.

What is claimed is:

1. A communication device comprising:
a memory configured to store management information in which, for each of a plurality of Object IDs (OID) of a Management Information Base (MIB), the OID and a setting value are associated with each other; and
a controller,
wherein the controller is configured to:
receive, from a terminal device, a setting command which conforms to Transmission Control Protocol (TCP) of a transport layer of an Open System Interconnection (OSI) reference model, wherein the setting command includes an OID and a setting value;
in a case where the setting command is received from the terminal device, write the setting value included in the setting command to the management information in association with the OID included in the setting command; and
in the case where the setting command is received from the terminal device, send a response command which conforms to the TCP to the terminal device,
wherein in a case where the setting command including a first OID and a first setting value is received from the terminal device, the controller is configured to:
write the first setting value to the management information in association with the first OID after the response command has been sent to the terminal device; and
send the response command to the terminal device before the first setting value is written to the management information.

2. The communication device as in claim 1, wherein
the plurality of OIDs includes predetermined one or more first-type OIDs and predetermined one or more second-type OIDs,
the first OID is one of the first-type OIDs,
wherein in a case where the setting command including a second OID which is one of the second-type OIDs and a second setting value is received from the terminal device, the controller is configured to:
write the second setting value to the management information in association with the second OID before the response command is sent to the terminal device; and
send the response command to the terminal device after the second setting value has been written to the management information.

3. The communication device as in claim 2,
wherein the memory is further configured to store determination information for determining whether the OID included in the setting command is one of the first-type OIDs or one of the second-type OIDs, and
the controller is further configured to:
in the case where the setting command is received from the terminal device, determine whether the OID included in the setting command is one of the first-type OIDs or one of the second-type OIDs by using the determination information stored in the memory,
wherein in a case where the setting command including the first OID and the first setting value is received from the terminal device and it is determined that the first OID is one of the first-type OIDs, the controller is configured to:
write the first setting value to the management information after the response command has been sent to the terminal device; and
send the response command to the terminal device before the first setting value is written to the management information, and
in a case where the setting command including the second OID and the second setting value is received from the terminal device and it is determined that the second OID is one of the second-type OIDs, the controller is configured to:
write the second setting value to the management information before the response command is sent to the terminal device; and
send the response command to the terminal device after the second setting value has been written to the management information.

4. The communication device as in claim 3,
wherein the determination information includes a list of the one or more first-type OIDs and does not include a list of the one or more second-type OIDs.

5. The communication device as in claim 2,
wherein the response command to the setting command including the second OID and the second setting value includes a specific value indicating that the second setting value has been written to the management information, and
the response command to the setting command including the first OID and the first setting value includes the specific value despite the first setting value having not been written to the management information yet.

6. The communication device as in claim 1,
wherein the controller is further configured to:
in the case where the setting command including the first OID and the first setting value is received from the terminal device, store the first OID and the first setting value in a predetermined storage area in the memory, wherein in the case where the setting command including the first OID and the first setting value is received from the terminal device, the controller is configured to write the first setting value to the management information by using the first OID and the first setting value in the predetermined storage area after the response command has been sent to the terminal device.

7. The communication device as in claim 1, wherein the first OID is an OID associated with a setting value for the communication device to execute communication.

8. The communication device as in claim 1, wherein the first OID is an OID associated with a setting value for the communication device to reboot.

9. The communication device as in claim 1, wherein the setting command is a command which conforms to a specific protocol above the transport layer of the OSI reference model, and the specific protocol is configured to execute encrypted communication.

10. The communication device as in claim 1, wherein the setting command is a command which conforms to a specific protocol above the transport layer of the OSI reference model, and the specific protocol is configured to execute user authentication.

11. The communication device as in claim 9, wherein the specific protocol is Hyper Text Transfer Protocol Secure (HTTPS).

12. The communication device as in claim 11, wherein the setting command includes a body part in which the OID and the setting value are described and a header part.

13. A non-transitory computer-readable recording medium storing computer-readable instructions for a communication device, wherein the communication device comprises:
a memory configured to store management information in which, for each of a plurality of Object IDs (OID) of a Management Information Base (MIB), the OID and a setting value are associated with each other; and
a processor,
wherein the computer-readable instructions, when executed by the processor, causing the communication device to:
receive, from a terminal device, a setting command which conforms to Transmission Control Protocol (TCP) of a transport layer of an Open System Interconnection (OSI) reference model, wherein the setting command includes an OID and a setting value;

in a case where the setting command is received from the terminal device, write the setting value included in the setting command to the management information in association with the OID included in the setting command; and in the case where the setting command is received from the terminal device, send a response command which conforms to the TCP to the terminal device, wherein in a case where the setting command including a first OID and a first setting value is received from the terminal device,
the first setting value is written to the management information in association with the first OID after the response command has been sent to the terminal device, and
the response command is sent to the terminal device before the first setting value is written to the management information.

14. A method performed by a communication device which comprises a memory configured to store management information in which, for each of a plurality of Object IDs (OID) of Management Information Base (MIB), the OID and a setting value are associated with each other, the method comprising:
receiving, from a terminal device, a setting command which conforms to Transmission Control Protocol (TCP) of a transport layer of an Open System Interconnection (OSI) reference model, wherein the setting command includes an OID and a setting value;
in a case where the setting command is received from the terminal device, writing the setting value included in the setting command to the management information in association with the OID included in the setting command; and
in the case where the setting command is received from the terminal device, sending a response command which conforms to the TCP to the terminal device,
wherein in a case where the setting command including a first OID and a first setting value is received from the terminal device,
the first setting value is written to the management information in association with the first OID after the response command has been sent to the terminal device, and
the response command is sent to the terminal device before the first setting value is written to the management information.

* * * * *